(12) United States Patent
Hickey

US006915586B2

(10) Patent No.: US 6,915,586 B2
(45) Date of Patent: Jul. 12, 2005

(54) BOX LEVEL

(75) Inventor: Robert A. Hickey, Sun Prairie, WI (US)

(73) Assignee: Empire Level Mfg. Corp., Milwaukee, WI (US)

( * ) Notice: Subject to any disclaimer, the term of this patent is extended or adjusted under 35 U.S.C. 154(b) by 0 days.

(21) Appl. No.: 10/643,094

(22) Filed: Aug. 18, 2003

(65) Prior Publication Data

US 2005/0039341 A1 Feb. 24, 2005

(51) Int. Cl.[7] .................................................. G01C 9/26
(52) U.S. Cl. ......................................... 33/382; 33/379
(58) Field of Search ........................ 33/365, 370, 371, 33/379, 381, 382, 451

(56) References Cited

U.S. PATENT DOCUMENTS

| | | |
|---|---|---|
| 1,034,049 A | 7/1912 | Wild |
| 2,373,249 A | 4/1945 | Lurcott, Jr. |
| 2,427,256 A | 9/1947 | Butscher |
| 2,810,206 A * | 10/1957 | Ziemann ...................... 33/381 |
| 3,029,524 A * | 4/1962 | Vaida et al. .................. 33/381 |
| 3,311,990 A * | 4/1967 | Wright ......................... 33/381 |
| 3,368,287 A | 2/1968 | Ault |
| 3,694,090 A | 9/1972 | Ohyama |
| 3,889,353 A | 6/1975 | Provi |
| 3,921,306 A | 11/1975 | Provi |
| 4,647,767 A | 3/1987 | Jubinski |
| 4,979,310 A * | 12/1990 | Wright ......................... 33/379 |
| 5,101,570 A | 4/1992 | Shimura |
| 5,103,569 A | 4/1992 | Leatherwood |
| 5,207,004 A | 5/1993 | Gruetzmacher |
| 5,272,816 A | 12/1993 | Fujiwara |
| 5,361,503 A | 11/1994 | Anderson |
| 5,414,937 A | 5/1995 | Denley |
| 5,467,532 A | 11/1995 | Ames |
| 5,479,717 A | 1/1996 | von Wedemeyer |
| 5,588,217 A | 12/1996 | Lindner et al. |
| 5,746,004 A | 5/1998 | Wertheim |
| 6,209,211 B1 * | 4/2001 | Szumer ........................ 33/382 |
| 6,293,023 B1 * | 9/2001 | Schooley ...................... 33/451 |
| 6,418,634 B1 | 7/2002 | Szumer |
| 6,675,490 B1 * | 1/2004 | Krehel et al. ................. 33/365 |

FOREIGN PATENT DOCUMENTS

| | | |
|---|---|---|
| FR | 0239030 | 9/1987 |
| GB | 2 080 529 | 7/1981 |

* cited by examiner

*Primary Examiner*—G. Bradley Bennett
(74) *Attorney, Agent, or Firm*—Jansson, Shupe & Munger, Ltd

(57) ABSTRACT

A box level including an elongate body, plumb vials, and spaced hand-holds having outer edges together defining first and second parallel application planes beyond first and second face planes of the elongate body, and further including hang openings in the elongate body near the opposite ends thereof and hang liners secured in the hang openings, each hang liner having first and second outer rims coplanar with the first and second application planes. The box level provides enlarged work application surfaces in a reliable manner not susceptible to dislodgement from long use and abuse.

19 Claims, 4 Drawing Sheets

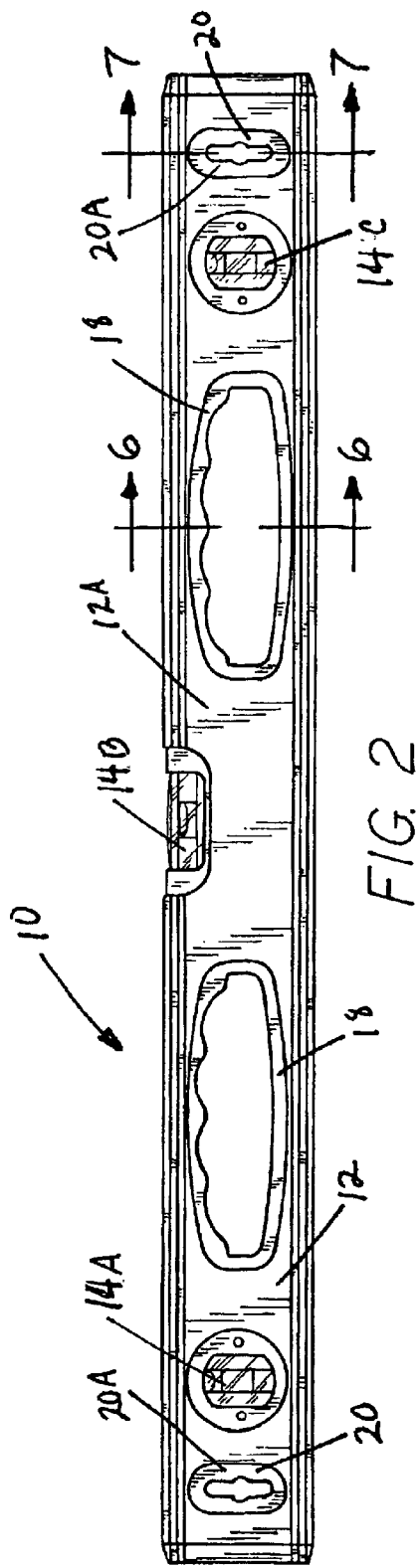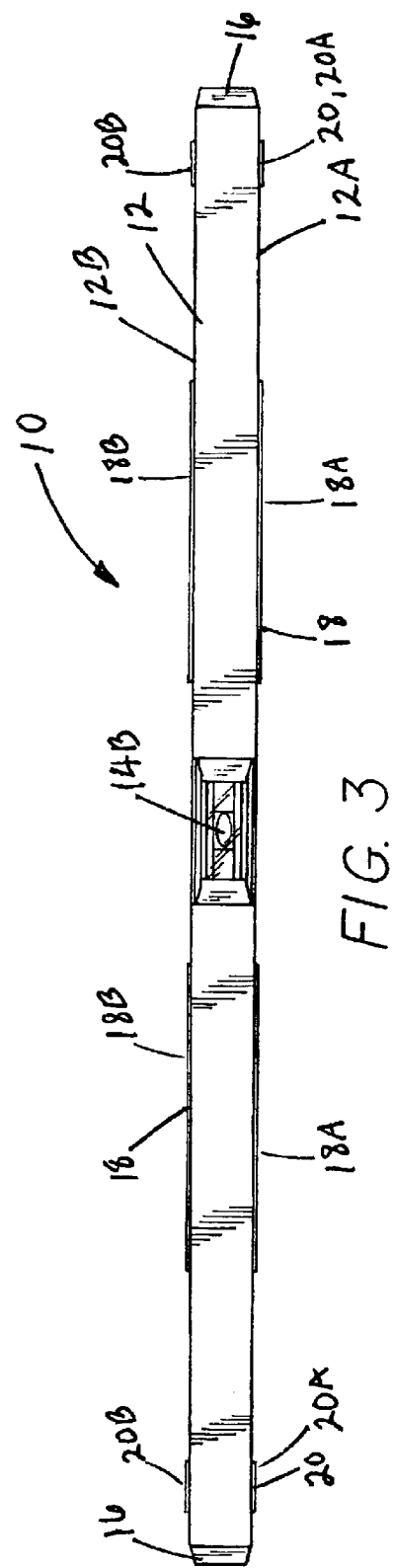

BOX LEVEL

FIELD OF THE INVENTION

This invention relates generally to spirit levels and, more particularly, to what are referred to as box levels.

BACKGROUND OF THE INVENTION

Box levels of the type to which this invention pertains each include an elongate body which defines vial openings with plumb vials secured therein, a pair of spaced hand-hold openings, and in many cases hang openings near the opposite ends of the body to allow the levels to be hung on pegs or other hangers for storage purposes. The elongate bodies are typically of hollow box-like configuration. Such elongate bodies, of course, further define opposed first and second face planes, as well as narrower flat edge surfaces.

Each such box level also includes a pair of hand-holds, often of plastic and/or rubber-like material, lining the two hand-hold openings and secured in such openings to the elongate body. These two hand-holds have outer edges near each of the face planes of the elongate body—i.e., on either side of the elongate body. The outer edges of the two hand-holds on each side of the elongate body together define a parallel application plane just beyond the corresponding face plane. Thus, each hand-hold has first and second outer edges, and the first outer edges of the two hand-holds define an application plane just beyond the first face plane while the second outer edges of the two hand-holds define an application plane just beyond the second face plane.

These hand-holds provide, on each face of the box level, an appropriate reference plane for application of the box level against work surfaces the orientations of which are being determined. When rubber-like hand-holds are used, the level is resistant to slipping that may make surface gauging somewhat problematic.

Given that the outer edges of the hand-holds of such levels sometimes provide application-plane surfaces that are insufficient for application of the box-level against certain work surfaces (due to dimensional considerations), steps have been taken in product design to provide additional in-plane surface members near the ends of box levels—i.e., additional surface members having surfaces in the application planes.

In some cases, such additional in-plane surface-enhancing members are on or are part of end-caps which are engaged with (inserted into) the opposite ends of the elongate body—typically to cover the end edges of the elongate bodies themselves. While this is useful, end-caps are frequently susceptible to accidental removal or fall off because of how box levels are used or abused. This, of course, eliminates the reference surface enhancement for which they were designed, leaving the box levels with less-than-satisfactory ability to be accurately applied to certain work surfaces.

In other cases, special nubs or other elements are mounted to one of the face-forming walls of the elongate body, by snap engagement in specially formed holes in the walls or by other means. These elements not only involve extra machining of holes in the elongate body, but may also be knocked off. Examples of these and the above-described end-cap features in box levels are disclosed in U.S. Pat. No. 5,479,717.

There is a need for an improved box level overcoming the afore-mentioned problems and reliably providing improved reference surfaces to facilitate the effective application and use of box levels with respect to a wide variety of work surfaces.

OBJECTS OF THE INVENTION

It is an object of the invention to provide an improved box level which overcomes some of the problems and shortcomings of the prior art.

Another object of the invention is to provide a sturdy box level with enhanced capability for work surface application.

Another object of the invention is to provide a box level which can be accurately held against a wide work surfaces of widely varying dimensions.

Another object of the invention is to provide an improved box level that is will retain excellent work surface application for the life of the level, despite long use and considerable abuse.

Still another object of the invention is to provide an improved box level with excellent work surface application and excellent slip-resistant qualities with respect to work surfaces of widely varying dimensions.

How these and other objects are accomplished will become apparent from the following descriptions and the drawings.

SUMMARY OF THE INVENTION

The improved box level of this invention is of the type including: an elongate body that defines vial openings, a pair of spaced hand-hold openings, opposed first and second face planes, and in some cases hang openings near the ends of the elongate body; plumb vials secured in the vial openings; and hand-holds secured in the hand-hold openings, the hand-holds having outer edges together defining first and second parallel application planes just beyond the first and second face planes, respectively. The improved box level overcomes certain problems and shortcomings of the prior art, including those described above.

The improved box level has hang openings as noted above near the opposite ends of the elongate body and hang liners are firmly secured in such hang openings, each hang liner having first and second outer rims coplanar with the first and second application planes that are defined by the outer edges of the hand-holds. This substantially and reliably enhances the first and second application surfaces, thereby accommodating work surfaces of greatly varying dimension.

As in past box levels, the elongate body is preferably a hollow box-like extrusion having first and second face-forming walls, and each of the hang liners is an integral piece extending from the first application plane to the second application plane. This firmly holds the hang liners in place such that they are not dislodged from engagement with the elongate body, even with long and abusive use.

In certain prior box levels, the hand-holds have been of rubber-like material—i.e., either rubber itself or a synthetic material of a well known type. In preferred embodiments of this inventions, the hand-holds and the hang liners are of rubber-like material, thus improving anti-slip characteristics.

Each of the hang liners preferably has a hook-engagement groove formed in it, to facilitate straight hanging of the box level when not in use.

The hang liners of this invention provide a significantly more reliable way to enhance the application surfaces of a box level. Each application surface includes the outer edges of two hand-holds and the outer rims of two hang liners. Given the wide space between the two hang liners, substantial application surface dimensions are provided. Such enhanced application surface is provided in a manner

BRIEF DESCRIPTION OF THE DRAWINGS

FIG. 2 is a front elevation.

FIG. 3 is a top view.

DETAILED DESCRIPTION OF PREFERRED EMBODIMENT

Figure 1:
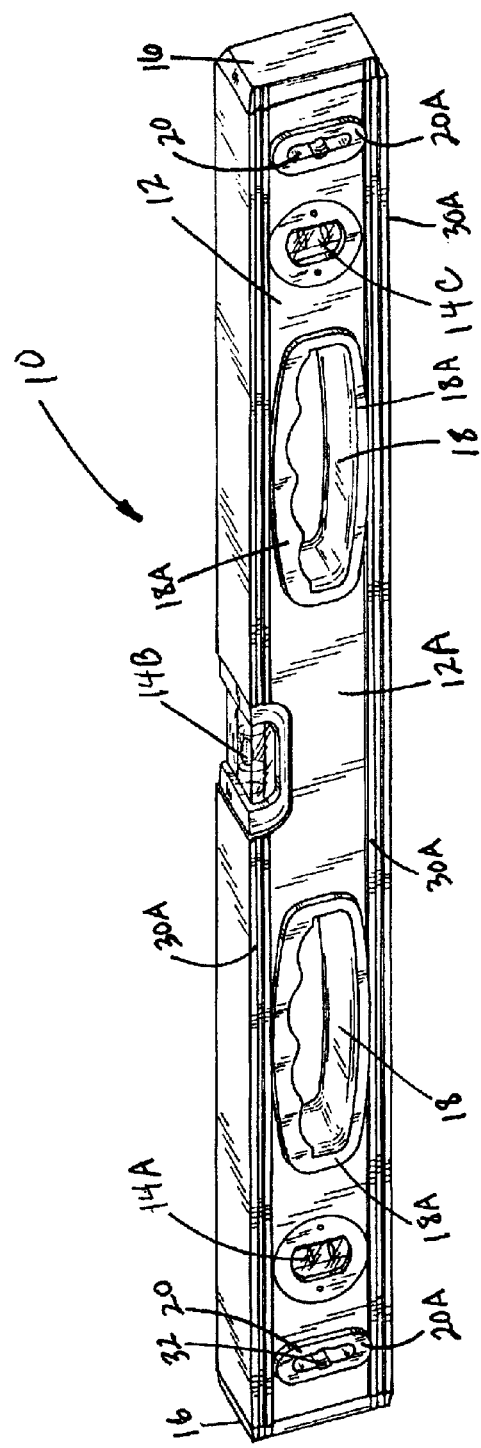
FIG. 1 is a perspective view of a preferred embodiment of the box level of this invention.
Figure 4:
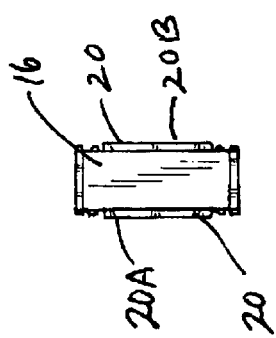
FIG. 4 is a right side elevation.
Figure 5:
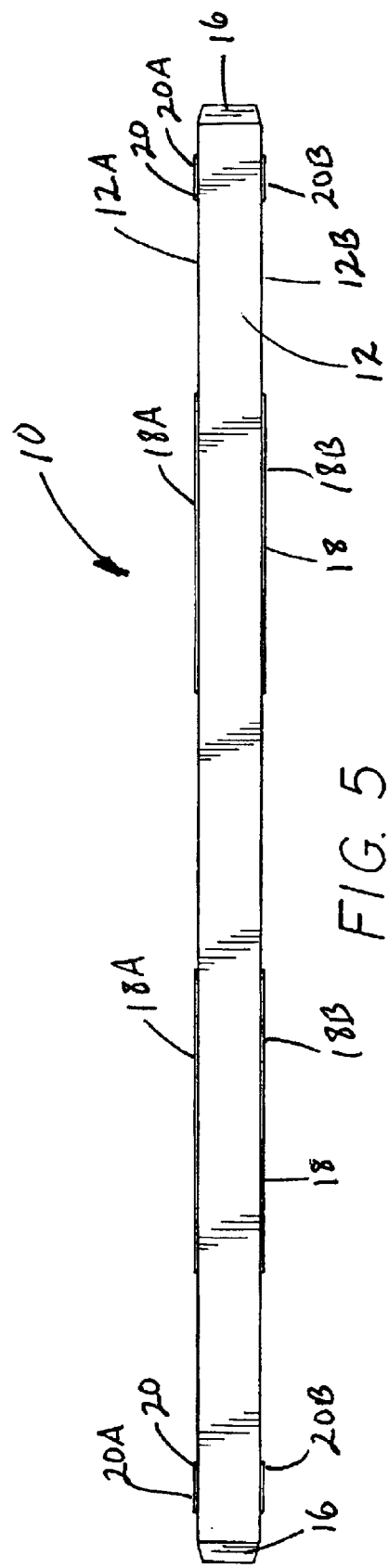
FIG. 5 is a bottom view.

The drawings illustrate improved box level 10. Box level 10, like prior box levels, includes an elongate body 12, which is an aluminum extrusion, three plum vials 14A, 14B and 14C, a pair of endcaps 16 and a pair of hand-holds 18. Box level 10 also includes a pair of hang liners 20.

Elongate body 12 defines three vial openings (not numbered), i.e., spaces, in which plum vials 14A, 14B and 14C are secured, respectively. Elongate body 12 also defines two hand-hold openings (not numbered) in which hand-holds 18 are secured. Finally, elongate body 12 also defines two hang openings (not numbered) near the opposite ends of box level 10; such hang openings receiving hang liners 20; hang liners 20 are secured to elongate body 12 in such hang openings. Endcaps 16 are attached to elongate body 12 at the opposite ends thereof.

Figure 6:
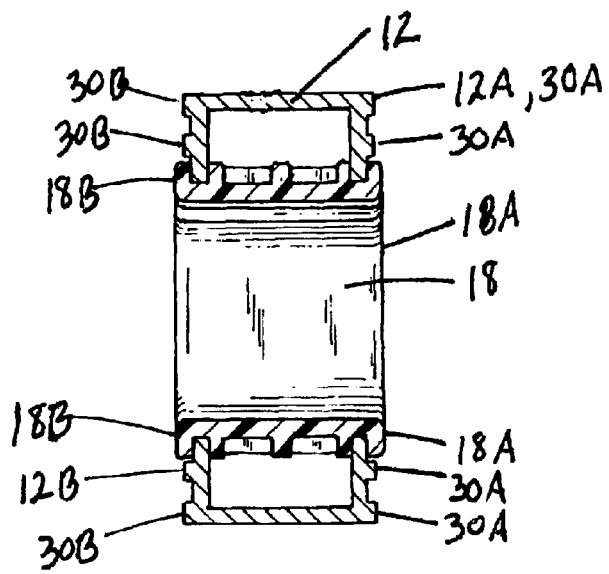
FIG. 6 is a left sectional view taken along section 6—6 as indicated in FIG. 2.
Figure 7:
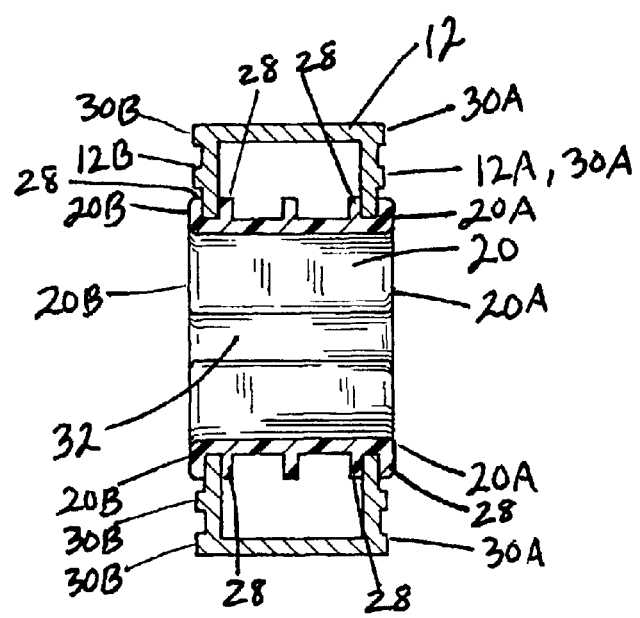
FIG. 7 is a left sectional view taken along section 7—7 as indicated in FIG. 2.

Elongate body 12 includes first and second face-forming walls 12A and 12B, respectively. Hand-holds 18 and hang liners 20 extend between first and second face-forming walls 12A and 12B and are configured for firm engagement with each of such walls. As shown in FIG. 6, each hand-hold 18 is an integral (unitary) member with outwardly projecting flanges formed to facilitate engagement with walls 12A and 12B of elongate body 12. As shown in FIG. 7, each hang liner 20 is an integral (unitary) member with outwardly projecting flanges 28 formed to facilitate engagement with walls 12A and 12B of elongate body 12. A flange 28 is on either side of each of walls 12A and 12B, and this firmly holds hang liners 20 in place.

Like hand-holds 18, hang liners 20 are of rubber-like material, as noted above. A wide variety of suitable materials can be used, the most suitable material being one which is tough while having a rubber-like surface which resists slippage when box level 10 is applied to a work surface. A highly preferred material is a 45 durometer thermoplastic elastomer.

First and second face-forming walls 12A and 12B define first and second faces. More specifically, four ridges 30A define a plane which relates to first face-forming wall 12A and four ridges 30B define a another plane which relates to second face-forming wall 12B. Each hand-hold 18 has first and second outer edges 18A and 18B, respectively. The first outer edges 18A of the two hand-holds 18 define a first work-surface application plane which is just beyond the first face plane mentioned above. Likewise, the second outer edges 18B of the two hand-holds 18 define a second work-surface application plane which is just beyond the second face plane mentioned above. The first and second application planes for work surfaces are parallel to one another.

Each hang liner 20 has first and second outer rims 20A and 20B, respectively. The first outer rims 20A of the two hang liners 20 are coplanar with the first work-surface application plane mentioned above; likewise, the second outer rims 20B of the two hang liners 20 are coplanar with the second work-surface application plane mentioned above. In referring to first and second outer rims 20A and 20B of each hang liner 20, reference is made to the distal surfaces thereof; i.e., reference is made to the surface of each rim which is in position to be applied to a work surface to hold the box level in proper position for gauging the orientation of the work surface. Thus, for the inventive box level, the aforementioned first application plane is now defined not only by first outer edges 18A of hand-holds 18, but by first outer rims 20A of hang liners 20. Likewise, the aforementioned second application plane is now defined not only by second outer edges 18B of hand-hold 18, but by second outer rims 20B of hang liners 20. And it is very significant that such additional in-plane members are reliably in place, not readily dislodged even with significant abuse of box level 10.

Each hang liner 20 has a rably has a hook-engagement groove 32 formed in it, to facilitate straight hanging of the box level on a peg or other hanger when box level 10 is not in use.

While the principles of the invention have been shown and described in connection with specific embodiments, it is to be understood that such embodiments are by way of example and are not limiting.

What is claimed is:

1. A box level comprising:
    an elongate body having a first wall and a second wall extending between opposite ends, the walls forming opposed first and second face planes and defining vial openings, a pair of spaced hand-hold openings and a hang opening at each end;
    plumb vials secured in the vial openings;
    hand-holds secured in the hand-hold openings and hang liners secured in the hang openings, the hand-holds and hang liners having outer edges together defining first and second parallel application planes just beyond the first and second face planes, respectively, the hand-holds and hang liners each having an interior surface defining a first outer flange, a first inner flange, a second outer flange, and a second inner flange, the first outer and inner flanges forming a first channel for receiving the first wall, the second outer and inner flanges forming a second channel for receiving the second wall; thereby providing a pair of accurate application surfaces which accommodate work surfaces of varying dimension.

2. The box level of claim 1 wherein the hang liners and the hand-holds are of rubber-like material.

3. The box level of claim 1 wherein each of the hang liners is an integral piece extending from the first application plane to the second application plane, thereby firmly holding the hang liner in place such that it is not dislodged from engagement with the elongate body.

4. The box level of claim 3 wherein the elongate body is a metal extrusion.

5. The box level of claim 3 wherein the hang liners and the hand-holds are of rubber-like material.

6. The box level of claim 3 wherein each hang liner has a hook-engagement groove formed therein.

7. A box level comprising:

an elongate body having a first wall and a second wall extending between opposite ends, the walls forming opposed first and second face planes and defining vial openings, a hang opening at each end;

plumb vials secured in the vial openings;

hang liners secured in the hang openings, the hang liners having outer edges together defining first and second bang liner planes just beyond the first and second face planes, respectively, the hang liners each having an interior surface defining a first outer flange, a first inner flange, a second outer flange, and a second inner flange, the fist outer and inner flanges forming a first channel for receiving the first wall, the second outer and inner flanges forming a second channel for receiving the second wall.

8. The box level of claim 7 wherein the hang liners are of rubber-like material.

9. The box level of claim 7 wherein each of the hang liners is an integral piece extending from the first hang liner plane to the second hang liner plane, thereby firmly holding the hang liner in place such that it is not dislodged from engagement with the elongate body.

10. The box level of claim 9 wherein the elongate body is a metal extrusion.

11. The box level of claim 9 wherein the hang liners are of rubber-like material.

12. The box level of claim 7 wherein each hang liner has a hook-engagement groove formed therein.

13. The box level of claim 12 wherein the hang liners are of rubber-like material.

14. The box level of claim 7 further including at least one hand-hold opening defined by the walls of the elongate body; a hand-hold secured in the hand-hold opening, the hand-hold having outer edges together defining first and second hand-hold planes just beyond the first and second face planes, respectively.

15. The box level of claim 14 wherein the first and second hang liner planes are coplanar the first and secondhand-hold planes respectively.

16. The box level of claim 15 wherein the hand-holds and hang liners are of rubber-like material.

17. A box level comprising:

an elongate body having a first wall and a second wall extending between opposite ends, the walls forming opposed first and second face planes and defining vial openings, at least one hand-hold opening;

plumb vials secured in the vial openings, a hand-hold secured in the hand-hold opening, the hand-hold having outer edges defining first and second hand hold-planes just beyond the first and second face planes, respectively, the hand-bold having an interior surface defining a first outer flange, a first inner flange, a second outer flange, and a second inner flange, the first outer and inner flanges forming a first channel for receiving the first wall, the second outer and inner flanges forming a second channel for receiving the second wall.

18. The box level of claim 17 wherein the hand-hold is of rubber-like material.

19. The box level of claim 18 wherein the elongate body is a metal extrusion.

* * * * *

UNITED STATES PATENT AND TRADEMARK OFFICE
CERTIFICATE OF CORRECTION

PATENT NO. : 6,915,586 B2  
DATED : July 12, 2005  
INVENTOR(S) : Robert A. Hickey It is certified that error appears in the above-identified patent and that said Letters Patent is hereby corrected as shown below:

Column 2,  
Line 9, after "against", delete "a".  
Line 12, after "that", delete "is".  
Line 54, delete "inventions" and substitute -- invention --.

Column 3,  
Line 60, after "define", delete "a".

Column 4,  
Line 24, after "has", delete "a rably has".

Column 5,  
Line 9, delete "bang" and substitute -- hang --.  
Line 13, delete "fist" and substitute -- first --.

Column 6,  
Line 6, after "coplanar", insert -- with --; delete "secondhand-hold" and substitute -- second hand-hold --.  
Lines 19-20, delete "second hand hold-planes" and substitute -- second hand-hold planes --.  
Line 21, delete "hand-bold" and substitute -- hand-hold --.

Signed and Sealed this

Twenty-first Day of March, 2006

JON W. DUDAS  
*Director of the United States Patent and Trademark Office*